(12) United States Patent
Ochiai et al.

(10) Patent No.: US 6,852,789 B2
(45) Date of Patent: Feb. 8, 2005

(54) GLYCOLS STARTING MATERIALS CONTAINING DISPERSED SUPERFINE CERAMIC POWDER COAGULATES CAPABLE OF FORMING POLYESTER MOLDED BODIES HAVING HIGH MECHANICAL STRENGTH AND TRANSPARENCY

(75) Inventors: Mitsuru Ochiai, Hasuda (JP); Keiichi Iida, Kawasaki (JP); Naruyasu Ishibashi, Yokkaichi (JP)

(73) Assignee: Degussa - AG (DE)

( * ) Notice: Subject to any disclaimer, the term of this patent is extended or adjusted under 35 U.S.C. 154(b) by 469 days.

(21) Appl. No.: 10/076,079

(22) Filed: Feb. 15, 2002

(65) Prior Publication Data

US 2003/0158329 A1 Aug. 21, 2003

(51) Int. Cl.$^7$ ............................. C08K 3/34; C08K 3/22; C08G 63/78
(52) U.S. Cl. ....................... 524/493; 524/430; 524/604; 528/282; 528/283
(58) Field of Search ................................ 524/430, 493, 524/604, 847; 528/282, 283

(56) References Cited

U.S. PATENT DOCUMENTS 6,648,645 B1 * 11/2003 MacDougald et al. ...... 433/223

FOREIGN PATENT DOCUMENTS

| JP | 63104951 | * | 11/1989 |
| JP | 02034659 | * | 2/1990 |

* cited by examiner

*Primary Examiner*—Tae H. Yoon
(74) *Attorney, Agent, or Firm*—Smith, Gambrell & Russell, LLP

(57) ABSTRACT

Glycol starting materials for manufacturing a polyester molded body containing 1 to 20% by weight of dispersed superfine ceramic powder aggregates relative to the total weight of the glycol for enabling polyester molded bodies having a high mechanical strength and transparency to be manufactured. The superfine ceramic powder aggregates dispersed in the glycol starting material have a mean particle size of 0.05 to 0.5 $\mu$m as measured with a laser diffraction particle size distribution analyzer, and wherein the peak indicated in a particle size distribution curve of the superfine ceramic powder aggregates obtained based on the results of the measurement satisfies the relationship of w/h$\leq$0.7, wherein h is the peak height and w is the peak width at one half of the peak height (a half-width).

8 Claims, 2 Drawing Sheets

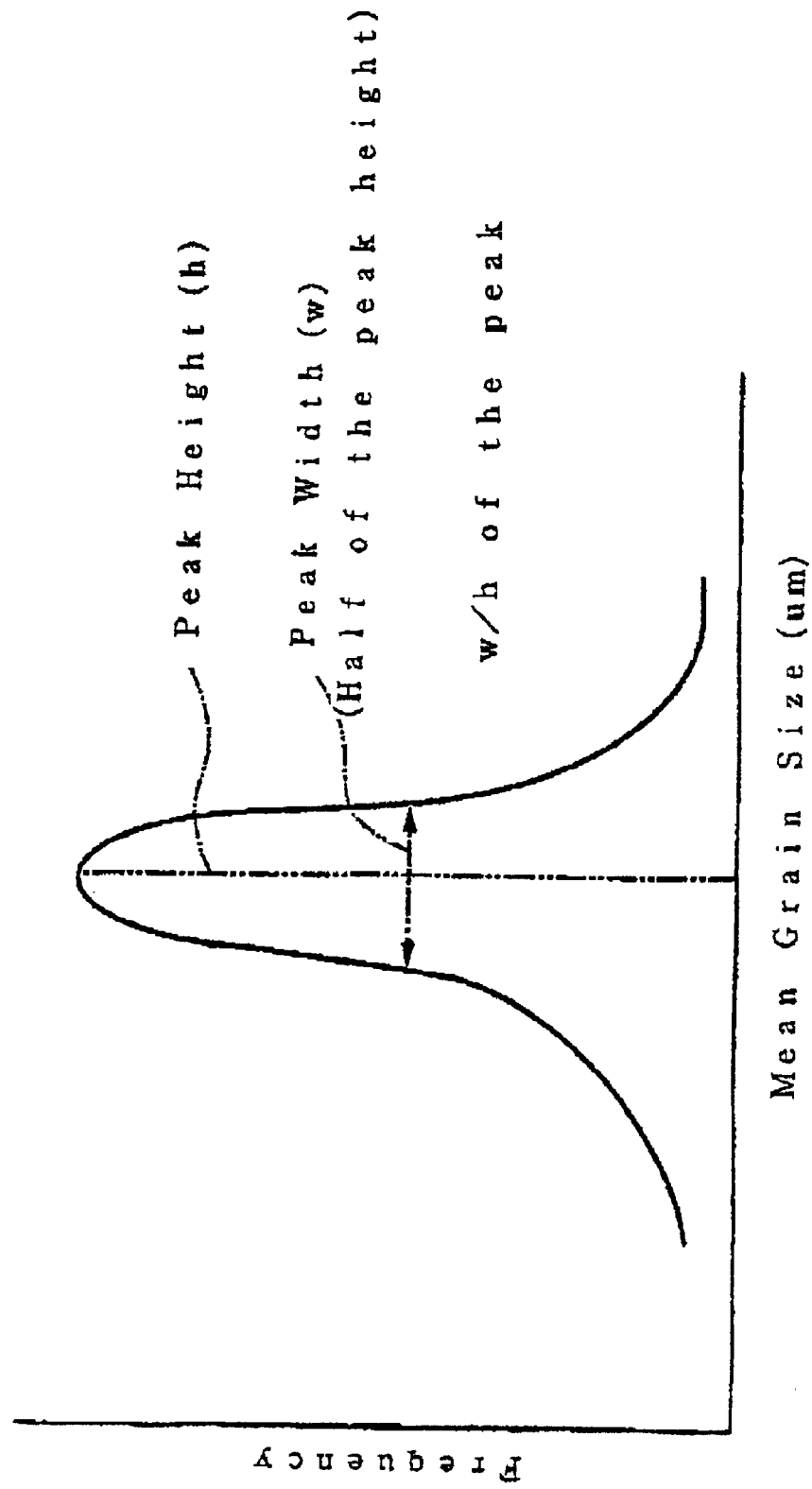
[Fig 1]

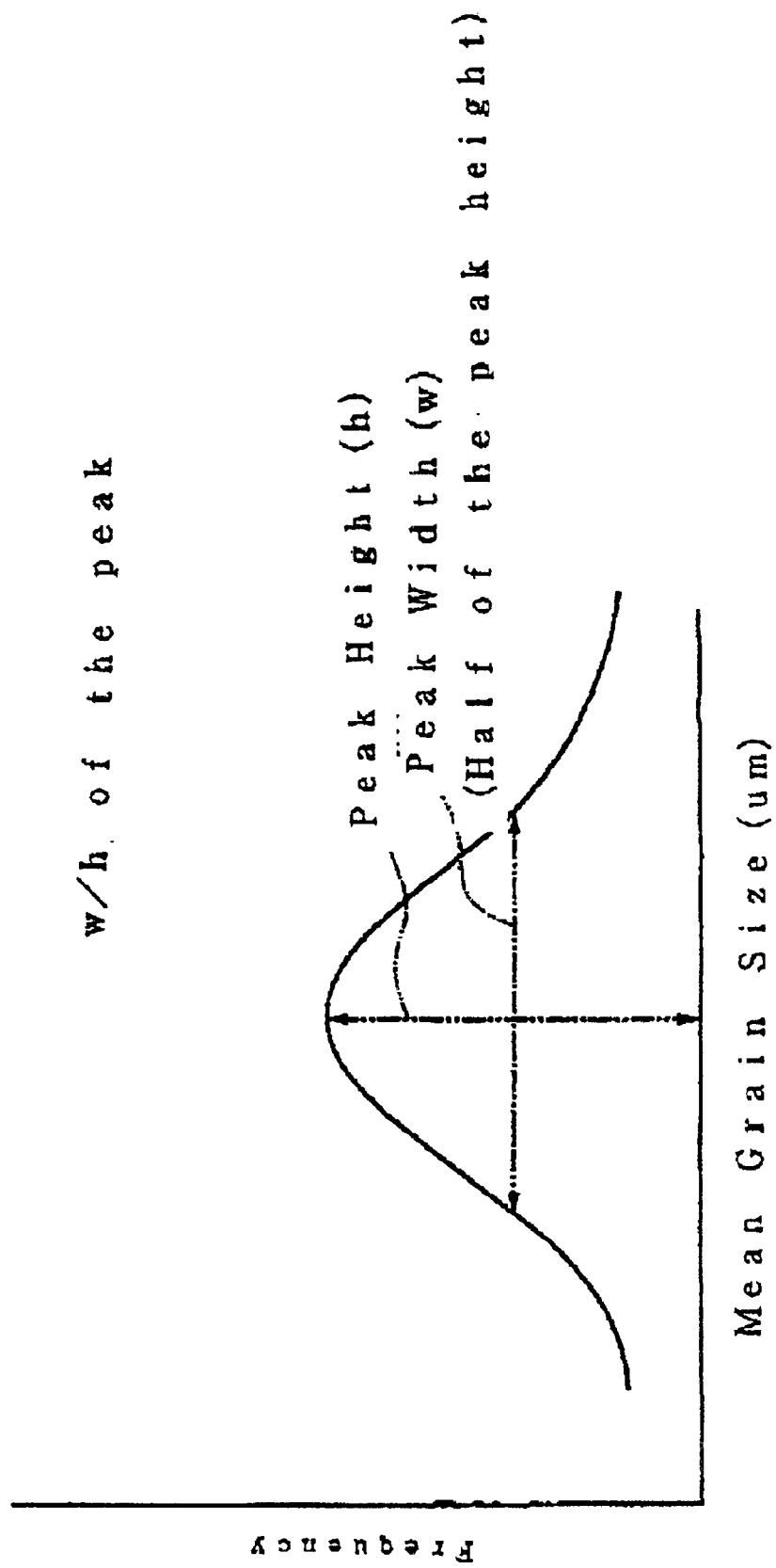

GLYCOLS STARTING MATERIALS CONTAINING DISPERSED SUPERFINE CERAMIC POWDER COAGULATES CAPABLE OF FORMING POLYESTER MOLDED BODIES HAVING HIGH MECHANICAL STRENGTH AND TRANSPARENCY

BACKGROUND OF THE INVENTION

1. Field of the Invention

The present invention relates to glycol starting materials containing dispersed superfine ceramic powder aggregates that enables polyester molded bodies to be thin and to have a fine fiber size, as well as to improve the transparency thereof, when the material is used for manufacturing polyester molded bodies suitable for films and threads.

2. Description of the Related Art

Conventional polyesters have been manufactured by a process comprising: esterifying a polycarboxylic acid such as terephthalic acid with an alkylene glycol such as ethylene glycol at 260° C. in a reaction vessel; forming a polyester polymer by allowing the polymerization reaction to proceed; and quenching the polyester polymer by ejecting the reaction product onto the surface of a quenching rotary drum for forming a film, or allowing the polyester polymer to spin out of fine perforation holes on a die having a number of perforation holes on its surface and rotating at a high speed like a top for spinning fibers.

It is known in the art that the type of glycol starting material used for manufacturing the polyester molded body contains 1 to 20% by weight of a superfine ceramic powder comprising silicon oxide (denoted as $SiO_2$ hereinafter), aluminum oxide (denoted as $Al_2O_3$ hereinafter) and titanium oxide (denoted as $TiO_2$ hereinafter) relative to the content of the glycol, in order to improve abrasion resistance and compatibility with dyes, and for preventing blocking.

The superfine ceramic powder to be used for dispersing into the glycol starting material is usually manufactured by a gas-phase reaction of $SiCl_4$, $AlCl_3$ or $TiCl_4$ with hydrogen and oxygen in a combustion burner flame. The superfine ceramic powder obtained has a very fine mean particle size of 40 nm or less, as determined by averaging the measured largest longitudinal diameters of an arbitrary plurality of particles observed in a field of view of the texture of the powder under a transmission type electron microscope. Since the powder comprises superfine particles, they inevitably aggregate to one another to form superfine ceramic powder aggregates generally with a mean diameter of 1 to 30 $\mu$m, even when the powder is added in the glycol starting material by grinding the powder in a ball mill.

The polyester molded body has been made to be light weight and small in size in compliance with the improvement and development of film casting and thread spinning technologies combined with diversity of needs. However, more improvements in making the film even thinner and making the diameter of the thread even finer as well as measuring the transparency of the films and threads are urgently desired in applying the technologies. However, thin films and fine threads have not been realized in the conventional polyester molded bodies due to insufficient mechanical strength, in addition to insufficient transparency.

SUMMARY OF THE INVENTION

Accordingly, an object of the present invention is to provide glycol starting materials containing dispersed superfine ceramic powder aggregates for enabling a polyester molded body having a high mechanical strength and transparency to be manufactured.

The above and other objects of the invention can be achieved by using glycol starting materials for manufacturing a polyester molded body containing 1 to 20% by weight of dispersed superfine ceramic powder aggregates relative to the total weight of the glycol for enabling polyester molded bodies having a high mechanical strength and transparency to be manufactured, wherein the superfine ceramic powder aggregates dispersed in the glycol starting material have a mean particle size of 0.05 to 0.5 $\mu$m as measured with a laser diffraction particle size distribution analyzer, and wherein the peak indicated in a particle size distribution curve of the superfine ceramic powder aggregates obtained based on the results of the measurement satisfies the relationship of $w/h \leq 0.7$, wherein h is the peak height and w is the peak width at one half of the peak height (a half-width).

BRIEF DESCRIPTION OF THE DRAWINGS

The present invention will be further understood with reference to the accompanying drawings, wherein:

FIG. 1 shows a particle size distribution curve of the superfine ceramic powder aggregates in the glycol starting material according to the present invention; and FIG. 2 shows a particle size distribution curve of the superfine ceramic powder aggregates in the conventional type of glycol starting material.

DESCRIPTION OF THE PREFERRED EMBODIMENTS

The inventors of the present invention have discovered glycol starting materials containing dispersed superfine ceramic powder aggregates useful for manufacturing polyester molded bodies, in order to improve the mechanical strength and transparency of the polyester molded bodies which can overcome the foregoing problems, and have obtained the following experimental results.

(a) The dispersed superfine ceramic powder aggregates contained in the glycol starting material have a mean particle size of 1 to 30 $\mu$m as measured with a laser diffraction particle size distribution analyzer. The particle size distribution curve of the superfine ceramic powder aggregates obtained based on the results of measurements showed a pattern illustrated in FIG. 2. The peak shown in the pattern is exhibited by a relationship of w/h=1 to 1.5, wherein h is the peak height and w is the peak width at one-half of the peak height (a half width). The relationship shows that the superfine ceramic powder aggregates are relatively coarse, and the particle size is irregular among the particles in the powder, or being poor in uniformity of the particle size. Since the fracture initiation points comprise the superfine ceramic powder aggregates having a relatively coarse particle size in the polyester molded body manufactured using the glycol starting materials containing dispersed superfine ceramic powder aggregates having a relatively coarse and irregular particle size distribution, the polyester cannot be endowed with a high mechanical strength. Moreover, it causes a decrease in transparency.

(b) A glycol starting material containing conventional dispersed superfine ceramic powder aggregates has been prepared by mixing, or by grinding with mixing, the superfine ceramic powder aggregates using a conventional mixer, ball-mill or rod-mill in the glycol. However, when the glycol starting material containing the conventional dispersed superfine ceramic powder aggregates is treated for further diminution in size with an ultrasonic homogenizer, or with a jet-mill by which the aggregates in a ultra-high jet stream collides to one another for a given period of time, the superfine ceramic powder aggregates in the glycol are quite rapidly pulverized with a high degree of pulverization. By adjusting the treatment time described above, the superfine ceramic powder aggregates dispersed in the glycol are pulverized to a mean particle size of 0.05 to 0.5 μm as measured with a laser particle size distribution analyzer. In addition, the particle size distribution curve of the superfine ceramic powder aggregates obtained based on the results of the measurement, or the peak in the particle size distribution curve shown in FIG. 1, satisfies the relation of w/h≦0.7, wherein h is the peak height and w is the peak width at one half of the peak height (a half-width). As a result, the superfine ceramic powder aggregates have good uniformity of particle size, or have a homogeneous particle size distribution as a whole, are uniformly dispersed in the entire polyester molded body manufactured using the glycol starting material in which the superfine ceramic powder aggregates are dispersed. Therefore, the superfine ceramic powder aggregates do not function as the fracture initiation points and endow the polyester molded body with high mechanical strength, besides improving transparency of the polyester molded body.

The mean particle size of the superfine ceramic powder aggregates in the glycol starting material according to the present invention was adjusted to 0.05 to 0.5 μm because, when the mean particle size is less than 0.05 μm, blocking preventive effect in the polyester molded body rapidly decreases, while the mechanical strength of the polyester molded body rapidly decreases since coarse particles with a mean particle size exceeding 0.5 μm function as the fracture initiation points. Desirably, the mean particle size is within a range of 0.1 to 0.2 μm.

The peak configuration of the particle size distribution curve of the superfine ceramic powder aggregates was made to satisfy the relation of w/h≦0.7 because, when the ratio is larger than 0.7, the proportion of the superfine ceramic powder aggregates having large differences in their particle size to one another becomes relatively so large that transparency becomes poor in the polyester molded body in which such superfine ceramic powder aggregates having large particle size differences among them are dispersed.

In addition, the content of the superfine ceramic powder aggregates was adjusted within a range of 1 to 20% by mass because, when the content is less than 1% by mass, the polyester molded body cannot be endowed with desirable abrasion resistance, compatibility with dyes and blocking preventive effect while, when the content exceeds 20% by mass, the mechanical strength of the polyester molded body rapidly decreases.

EXAMPLE

The glycol starting material according to the present invention will be described hereinafter with reference to the example.

Superfine $SiO_2$ powder, $Al_2O_3$ powder and $TiO_2$ powder were prepared by a gas phase hydrolysis reaction of $SiCl_4$, $AlCl_3$ and $TiCl_4$ as stating materials with oxygen and hydrogen using a combustion burner. Textures of these superfine ceramic powders were observed under a scanning type electron microscope, and the maximum longitudinal length of each arbitrarily selected 50 particles in a field of view was measured. Mean particle sizes were determined from these measured values as shown in Table 2. These superfine ceramic powder aggregates were added in the glycol with each proportion shown in Table 2 with stirring using a conventional mixer, and the glycol starting materials No. 1 to 15 containing the conventional superfine ceramic powder aggregates (referred to as the conventional glycol starting materials hereinafter) shown in Table 2 were manufactured.

Each of the conventional glycol starting materials No. 1 to 15 were treated with a jet mill for a prescribed time using the conventional glycol starting materials as jet sources, and the aggregates in the conventional glycol starting material were allowed to collide to one another. The treatment conditions were collision radius of the jet stream of 0.1 mm, and jet stream speed of 600 m/sec. The glycol starting materials containing the dispersed superfine ceramic powder aggregates according to the present invention (referred to as the glycol stating materials according to the present invention) No. 1 to 15 were manufactured by further pulverizing the superfine ceramic powder aggregates in the conventional glycol starting material.

The particle size distribution of the superfine ceramic powder aggregates in the glycol starting materials No. 1 to 15 according to the present invention, and in the conventional glycol starting materials No. 1 to 15, were measured using a laser diffraction particle size distribution analyzer. The mean particle size as well as the particle size distribution curve were obtained based on the results of these measurements, and w/h values of the peaks shown in the particle size distribution curves were calculated (wherein h is a peak height and w is a peak width (a half-width)). These results are shown in Tables 1 and 2.

For the purposes of investigating the effects of the glycol starting materials 1 to 15 according to the present invention, and of the conventional glycol starting materials 1 to 15, on the mechanical strength and transparency of polyester molded bodies, these glycol starting materials were added in the esterification reaction vessel in a proportion of 52 parts by weight relative to 100 parts by weight of terephthalic acid. The esterification reactions were carried out at 260° C., and the esters obtained were further polymerized to form polyesters. The polymer solution was injected between two water-cool type drums with a diameter of 150 mm, which rotate toward the inside to one another and are horizontally arranged in parallel to one another, from the upward, and was extruded into a film with a thickness of 1 mm. Polyester molded bodies were manufactured by subsequently heat-treating these films at 210° C. for three seconds.

Transparency and mechanical strength of each polyester molded body obtained were evaluated. The films were subjected to a pre-treatment in an atmosphere at a temperature of 23° C. and a humidity of 75% for 1.5 hours following JS K6758, and transparency was evaluated by measuring haze values (%) according to JIS K6714 and JIS K6718.

Test pieces of 50 mm in width and 5 mm in length were cut from the films, and fracture strength of each film was measured for evaluating the mechanical strength. The results of these measurements are shown in Tables 1 and 2.

TABLE 1

| CLASSIFICATION | | SUPERFINE CERAMIC POWDER | | SUPERFINE CERAMIC POWDER AGGREGATES | | | POLYESTER MOLDED BODY | |
|---|---|---|---|---|---|---|---|---|
| | MATERIAL | MEAN PARTICLE SIZE (nm) | | CONTENT (% BY MASS) | MEAN PARTICLE SIZE (μM) | w/h OF THE PEAK | HAZE (%) | FRACTURE STRENGTH (Pa) |
| The GLYCOL STARTING MATERIAL ACCORDING TO THE PRESENT INVENTION | 1 SiO$_2$ | 40 | | 1 | 0.140 | 0.48 | 0.8 | 50.2 |
| | 2 SiO$_2$ | 7 | | 5 | 0.098 | 0.51 | 1.0 | 53.6 |
| | 3 SiO$_2$ | 12 | | 10 | 0.118 | 0.65 | 1.0 | 57.4 |
| | 4 SiO$_2$ | 30 | | 15 | 0.107 | 0.46 | 1.2 | 55.1 |
| | 5 SiO$_2$ | 7 | | 20 | 0.110 | 0.66 | 1.3 | 60.3 |
| | 6 SiO$_2$ | 30 | | 20 | 0.400 | 0.70 | 1.4 | 53.4 |
| | 7 SiO$_2$ | 40 | | 20 | 0.500 | 0.65 | 1.5 | 52.6 |
| | 8 SiO$_2$ | 12 | | 10 | 0.102 | 0.45 | 1.1 | 58.6 |
| | 9 SiO$_2$ | 12 | | 10 | 0.105 | 0.47 | 1.1 | 59.1 |
| | 10 SiO$_2$ | 30 | | 20 | 0.400 | 0.58 | 1.4 | 54.3 |
| | 11 SiO$_2$ | 40 | | 20 | 0.500 | 0.61 | 1.5 | 51.9 |
| | 12 Al$_2$O$_3$ | 13 | | 1 | 0.121 | 0.54 | 0.9 | 49.6 |
| | 13 Al$_2$O$_3$ | 13 | | 5 | 0.119 | 0.53 | 1.3 | 52.1 |
| | 14 Al$_2$O$_3$ | 13 | | 10 | 0.122 | 0.63 | 1.2 | 55.8 |
| | 15 Al$_2$O$_3$ | 13 | | 15 | 0.130 | 0.65 | 1.2 | 57.6 |
| | 16 Al$_2$O$_3$ | 13 | | 20 | 0.128 | 0.58 | 1.1 | 58.9 |
| | 17 Al$_2$O$_3$ | 13 | | 20 | 0.400 | 0.60 | 1.3 | 56.2 |
| | 18 Al$_2$O$_3$ | 13 | | 20 | 0.500 | 0.57 | 1.4 | 55.3 |

TABLE 2

| CLASSIFICATION | | SUPERFINE CERAMIC POWDER | | SUPERFINE CERAMIC POWDER AGGREGATES | | | POLYESTER MOLDED BODY | |
|---|---|---|---|---|---|---|---|---|
| | MATERIAL | MEAN PARTICLE SIZE (nm) | | CONTENT (% BY MASS) | MEAN PARTICLE SIZE (μM) | w/h OF THE PEAK | HAZE (%) | FRACTURE STRENGTH (Pa) |
| The GLYCOL STARTING MATERIAL ACCORDING TO THE PRESENT INVENTION | 19 Al$_2$O$_3$ | 13 | | 10 | 0.125 | 0.57 | 1.2 | 56.7 |
| | 20 Al$_2$O$_3$ | 13 | | 10 | 0.125 | 0.57 | 1.2 | 56.7 |
| | 21 Al$_2$O$_3$ | 13 | | 20 | 0.400 | 0.56 | 1.4 | 55.1 |
| | 22 Al$_2$O$_3$ | 13 | | 20 | 0.500 | 0.57 | 1.9 | 54.2 |
| | 23 TiO$_2$ | 39 | | 1 | 0.125 | 0.48 | 0.9 | 43.0 |
| | 24 TiO$_2$ | 21 | | 5 | 0.142 | 0.32 | 1.0 | 46.2 |
| | 25 TiO$_2$ | 13 | | 10 | 0.134 | 0.60 | 1.2 | 48.4 |
| | 26 TiO$_2$ | 21 | | 15 | 0.144 | 0.65 | 1.2 | 50.1 |
| | 27 TiO$_2$ | 13 | | 20 | 0.139 | 0.40 | 1.4 | 52.3 |
| | 28 TiO$_2$ | 21 | | 20 | 0.400 | 0.67 | 1.3 | 52.0 |
| | 29 TiO$_2$ | 39 | | 20 | 0.500 | 0.69 | 1.4 | 51.1 |
| | 30 TiO$_2$ | 21 | | 20 | 0.130 | 0.39 | 1.1 | 53.3 |
| | 31 TiO$_2$ | 13 | | 20 | 0.145 | 0.41 | 1.0 | 52.9 |
| | 32 TiO$_2$ | 39 | | 20 | 0.400 | 0.62 | 1.3 | 50.1 |
| | 33 TiO$_2$ | 39 | | 20 | 0.500 | 0.65 | 1.5 | 51.8 |
| | 34 SiO$_2$:50/Al$_2$O$_3$:50 | 30 | | 10 | 0.124 | 0.43 | 1.2 | 56.2 |
| | 35 SiO$_2$:50/Al$_2$O$_3$:50 | 25 | | 10 | 0.130 | 0.51 | 1.4 | 52.1 |
| | 36 SiO$_2$:50/Al$_2$O$_3$:50 | 30 | | 20 | 0.500 | 0.60 | 1.5 | 53.2 |
| | 37 SiO$_2$:50/Al$_2$O$_3$:50 | 25 | | 20 | 0.500 | 0.62 | 1.4 | 52.9 |

TABLE 3

| CLASSIFICATION | | SUPERFINE CERAMIC POWDER | | SUPERFINE CERAMIC POWDER AGGREGATES | | | POLYESTER MOLDED BODY | |
|---|---|---|---|---|---|---|---|---|
| | MATERIAL | MEAN PARTICLE SIZE (nm) | | CONTENT (% BY MASS) | MEAN PARTICLE SIZE (μM) | w/h OF THE PEAK | HAZE (%) | FRACTURE STRENGTH (Pa) |
| CONVENTIONAL kind of GLYCOL STARTING MATERIAL | 1 SiO$_2$ | 40 | | 1 | 1.56 | 1.00 | 1.9 | 36.8 |
| | 2 SiO$_2$ | 7 | | 5 | 1.50 | 1.10 | 2.2 | 36.1 |
| | 3 SiO$_2$ | 12 | | 10 | 20.4 | 1.48 | 2.3 | 35.2 |
| | 4 SiO$_2$ | 30 | | 15 | 28.8 | 1.50 | 2.8 | 34.5 |
| | 5 SiO$_2$ | 7 | | 20 | 30.8 | 1.50 | 2.8 | 33.6 |
| | 6 SiO$_2$ | 30 | | 20 | 29.5 | 1.53 | 2.9 | 32.1 |
| | 7 SiO$_2$ | 40 | | 20 | 31.6 | 1.64 | 2.9 | 34.4 |

TABLE 3-continued

| | | SUPERFINE CERAMIC POWDER | | SUPERFINE CERAMIC POWDER AGGREGATES | | | POLYESTER MOLDED BODY | |
|---|---|---|---|---|---|---|---|---|
| CLASSIFICATION | MATERIAL | MEAN PARTICLE SIZE (nm) | | CONTENT (% BY MASS) | MEAN PARTICLE SIZE (μM) | w/h OF THE PEAK | HAZE (%) | FRACTURE STRENGTH (Pa) |
| | 8 $SiO_2$ | 12 | | 10 | 18.6 | 1.28 | 2.8 | 33.5 |
| | 9 $SiO_2$ | 12 | | 10 | 17.5 | 1.19 | 2.8 | 36.2 |
| | 10 $SiO_2$ | 30 | | 20 | 29.2 | 1.51 | 2.9 | 35.1 |
| | 11 $SiO_2$ | 40 | | 20 | 28.6 | 1.63 | 2.9 | 34.7 |
| | 12 $Al_2O_3$ | 13 | | 1 | 1.80 | 1.01 | 1.9 | 38.2 |
| | 13 $Al_2O_3$ | 13 | | 5 | 10.6 | 1.15 | 2.0 | 37.0 |
| | 14 $Al_2O_3$ | 13 | | 10 | 29.2 | 1.44 | 1.9 | 36.2 |
| | 15 $Al_2O_3$ | 13 | | 15 | 30.5 | 1.60 | 2.5 | 35.3 |
| | 16 $Al_2O_3$ | 13 | | 20 | 31.0 | 1.62 | 2.5 | 34.3 |
| | 17 $Al_2O_3$ | 13 | | 20 | 31.0 | 1.62 | 2.5 | 34.3 |
| | 18 $Al_2O_3$ | 13 | | 20 | 31.0 | 1.62 | 2.5 | 34.3 |

TABLE 4

| | | SUPERFINE CERAMIC POWDER | SUPERFINE CERAMIC POWDER AGGREGATES | | | POLYESTER MOLDED BODY | |
|---|---|---|---|---|---|---|---|
| CLASSIFICATION | MATERIAL | MEAN PARTICLE SIZE (nm) | CONTENT (% BY MASS) | MEAN PARTICLE SIZE (μM) | w/h OF THE PEAK | HAZE (%) | FRACTURE STRENGTH (Pa) |
| CONVENTIONAL | 19 $Al_2O_3$ | 13 | 10 | 1.56 | 1.00 | 1.9 | 36.8 |
| kind of GLYCOL | 20 $Al_2O_3$ | 13 | 10 | 1.50 | 1.10 | 2.2 | 36.1 |
| STARTING | 21 $Al_2O_3$ | 13 | 20 | 20.4 | 1.48 | 2.3 | 35.2 |
| MATERIAL | 22 $Al_2O_3$ | 13 | 20 | 28.8 | 1.50 | 2.8 | 34.5 |
| | 23 $TiO_2$ | 39 | 1 | 1.20 | 1.02 | 1.9 | 40.1 |
| | 24 $TiO_2$ | 21 | 5 | 10.5 | 1.22 | 2.3 | 39.2 |
| | 25 $TiO_2$ | 13 | 10 | 25.9 | 1.40 | 2.5 | 37.7 |
| | 26 $TiO_2$ | 21 | 15 | 25.8 | 1.40 | 2.3 | 37.0 |
| | 27 $TiO_2$ | 13 | 20 | 28.6 | 1.52 | 2.8 | 36.4 |
| | 28 $TiO_2$ | 21 | 20 | 25.2 | 1.61 | 2.5 | 30.7 |
| | 29 $TiO_2$ | 39 | 20 | 27.4 | 1.52 | 2.4 | 34.5 |
| | 30 $TiO_2$ | 21 | 20 | 26.3 | 1.64 | 2.5 | 36.6 |
| | 31 $TiO_2$ | 13 | 20 | 25.4 | 1.63 | 2.7 | 34.9 |
| | 32 $TiO_2$ | 39 | 20 | 29.6 | 1.55 | 2.8 | 38.7 |
| | 33 $TiO_2$ | 39 | 20 | 30.3 | 1.51 | 2.9 | 35.6 |
| | 34 $SiO_2$:50/$Al_2O_3$:50 | 30 | 10 | 27.2 | 1.58 | 2.8 | 38.2 |
| | 35 $SiO_2$:50/$Al_2O_3$:50 | 25 | 10 | 24.3 | 1.61 | 2.8 | 37.9 |
| | 36 $SiO_2$:50/$Al_2O_3$:50 | 30 | 10 | 26.5 | 1.55 | 2.6 | 37.2 |
| | 37 $SiO_2$:50/$Al_2O_3$:50 | 25 | 10 | 23.1 | 1.48 | 2.7 | 36.5 |

Table 1 shows that the superfine ceramic powder aggregates dispersed in all the glycol starting materials 1 to 15 according to the present invention have a mean particle size of 0.05 to 0.5 μm and the w/h values of 0.7 or less at the peak. The aggregates are finer and have better uniformity of the particle size distribution as compared with the superfine ceramic powder aggregates having a mean particle size of 1 to 30 μm and w/h values of 1 to 1.5 in the conventional glycol starting material. Accordingly, the polyester molded bodies manufactured by using the glycol starting materials 1 to 15 according to the present invention clearly have a relatively higher mechanical strength and better transparency as compared with the polyester molded bodies manufactured by using conventional glycol starting materials No. 1 to 15.

As hitherto described, the glycol starting materials containing the superfine ceramic powder aggregates according to the present invention enable the manufacture of polyester molded bodies having a high mechanical strength and transparency; making it possible to obtain thinner and finer polyester molded bodies, and to improve transparency of the molded bodies. Examples of glycols include propylene glycol butylene glycol and ethylene glycols and other glycols. The preferred components are 1,3-propylene glycol, 1,4-butylene glycol and 1,2-ethylene glycol).

Further variation and modifications of the foregoing will be apparent to those skilled in the art and are intended to be encompassed by the claims appended hereto.

We claim:

1. A glycol starting material for the manufacture of a polyester molded body containing 1 to 20% by weight of dispersed superfine ceramic powder aggregates relative to the total weight of the glycol wherein the superfine ceramic powder aggregates dispersed in the glycol starting material have a mean particle size of 0.05 to 0.5 μm measurement as measured with a laser diffraction particle size distribution analyzer, and wherein a peak indicated in a particle size distribution curve of the superfine ceramic powder aggregates obtained based on results of the measurement satisfies the relationship of w/h≦0.7, wherein h is peak height and w is the peak width at one half of the peak height.

2. A polyester molded body made from the glycol starting material as defined in claim 1.

3. The glycol starting material according to claim 1 wherein the glycol is a member selected from the group consisting of propylene glycol, butylene glycol, ethylene glycol and mixtures thereof.

4. The glycol starting material according to claim 3 wherein said glycol is 1,3-propylene glycol, 1,4-butylene glycol or 1,2-ethylene glycol.

5. The glycol starting material according to claim 1 wherein the ceramic power is selected from the group consisting of $SiO_2$, $Al_2O_3$, $TiO_2$ and mixtures thereof.

6. A film of polyester made from the glycol starting material according to claim 1.

7. A thread of polyester made from the glycol starting material according to claim 1.

8. A method of making a thin polyester molded body comprising mixing a super fine ceramic powder aggregate with an alkylene glycol, subjecting said glycol mixed with said ceramic powder to further diminution in size to produce super fine ceramic powder aggregates pulverized to a mean particle size of 0.05 to 0.5 µm in said glycol, and reacting a polycarboxylic acid with said glycol containing said pulverized ceramic powder to obtain a polyester and molding said polyester into a thin body.

\* \* \* \* \*

UNITED STATES PATENT AND TRADEMARK OFFICE
CERTIFICATE OF CORRECTION

| | |
|---|---|
| PATENT NO. | : 6,852,789 B2 |
| APPLICATION NO. | : 10/076079 |
| DATED | : February 8, 2005 |
| INVENTOR(S) | : Mitsuru Ochiai et al. |

Page 1 of 1

It is certified that error appears in the above-identified patent and that said Letters Patent is hereby corrected as shown below:

On the Title page of the patent, the Assignee section should read as follows:

Item (73)    Assignees:    Degussa-AG (DE); Nippon Aerosil Co., Ltd. (JP)

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 6,852,789 B2
APPLICATION NO. : 10/076079
DATED : February 8, 2005
INVENTOR(S) : Mitsuru Ochiai et al.

Page 1 of 1

It is certified that error appears in the above-identified patent and that said Letters Patent is hereby corrected as shown below:

On the Title page of the patent, the Assignee section should read as follows:

Item (73)   Assignees:   Degussa AG (DE); Nippon Aerosil Co., Ltd. (JP)

This certificate supersedes Certificate of Correction issued April 17, 2007.

Signed and Sealed this

Seventh Day of August, 2007

JON W. DUDAS
*Director of the United States Patent and Trademark Office*